(12) United States Patent
Hays

(10) Patent No.: US 9,850,632 B1
(45) Date of Patent: Dec. 26, 2017

(54) K9-FORK

(71) Applicant: John Phillip Hays, Valley Center, KS (US)

(72) Inventor: John Phillip Hays, Valley Center, KS (US)

( * ) Notice: Subject to any disclaimer, the term of this patent is extended or adjusted under 35 U.S.C. 154(b) by 0 days.

(21) Appl. No.: 15/591,217

(22) Filed: May 10, 2017

(51) Int. Cl.
*E01H 1/12* (2006.01)
*A01K 29/00* (2006.01)
*A01K 23/00* (2006.01)

(52) U.S. Cl.
CPC ......... *E01H 1/1206* (2013.01); *A01K 23/005* (2013.01); *E01H 2001/1293* (2013.01)

(58) Field of Classification Search
CPC .......... E01H 1/1206; E01H 2001/1293; A01K 23/005
USPC .................................. 294/1.4, 55.5
See application file for complete search history.

(56) References Cited

U.S. PATENT DOCUMENTS

| | | | | |
|---|---|---|---|---|
| 3,310,332 A * | 3/1967 | Nelson | .................. | E01H 1/1206 294/1.4 |
| 3,879,079 A * | 4/1975 | Nicholas | ............... | E01H 1/1206 294/1.4 |
| 5,816,632 A * | 10/1998 | Baldacci | .................. | E01H 5/12 294/51 |
| 5,868,447 A * | 2/1999 | Clark | .................... | E01H 1/1206 15/257.3 |
| 5,921,596 A * | 7/1999 | Sheriff | ................. | A01K 1/0114 209/418 |
| D437,462 S * | 2/2001 | Whall | ............................ | 294/1.4 |
| 6,312,029 B1* | 11/2001 | Renforth | .............. | A01K 1/0114 209/418 |
| 2009/0058114 A1* | 3/2009 | Diehl | .................... | E01H 1/1206 294/1.4 |

* cited by examiner

*Primary Examiner* — Dean J Kramer

(57) ABSTRACT

A tool for removing and holding dog excrement from both grass, and other non-grass surfaces, comprised of a pole handle at the upper portion and a set of beveled tines and collection pan on the lower end. The handle is connected at the rear of the collection pan at a an angle which aids in placement of the fork in the best possible position for leverage and moving smoothly beneath the feces. The separated beveled tines allow easy penetration of grass or debris beneath the feces, which is moved over the beveled tines and into the collection pan with a slight tip of the fork. The collection pan is formed with raised front, back and sidewalls, which recess the collection pan to hold the gathered feces. The collection pan is capable of containing considerable feces prior to being emptied into an appropriate trash receptacle.

4 Claims, 4 Drawing Sheets

K9-FORK

CROSS-REFERENCE TO RELATED APPLICATIONS

This application claims priority to U.S. Provisional Application No. 62/391,866, filed May 13, 2016, which is hereby incorporated by reference.

BACKGROUND OF THE INVENTION

Field of the Invention

The present invention is directed to an implement to facilitate fast and trouble-free removal of canine waste from various surfaces such as: grass, concrete, gravel, mulch, as well as bare ground. For many years, since canine pets have been confined to fenced yards or large outside penned areas, pet owners have had the need for a tool to aid in keeping these areas clean and sanitary, by removing pet waste from moderate to deep grass and other outside surfaces on a regular basis. Numerous devices have been conceived with the goal of removing pet waste from yards, large pens and other surfaces, however most of those have either not been effective, were poorly constructed, difficult to use or never proved to be successful in reaching the marketplace.

Despite the various attempts to provide canine owners with solutions, the tools and devices marketed today fall short in solving most of the problems that pet owners are looking to remedy. Problems like; constant bending over to collect the feces, having a tool with two parts requiring both hands to remove the deposits, having to empty the tool with each pickup, or the device can't get through long or thick grass to remove the feces. Other tools are constructed with very poor or weak materials, or have spring loaded or other moving parts, which tend to break and render the tool useless. A failure analysis of existing tools has lead to development of the present invention, which addresses these shortcomings.

SUMMARY OF THE INVENTION

The present invention is designed to easily and effectively remove canine feces from a variety of surfaces and contain multiple feces in the built in collection pan. The invention has beveled tines at the front of the tool, which are slightly separated and a long handle connected at an angle, which allows the user to remain in an upright forceful position during use, thus allowing the tool to collect the feces by easily slipping through grass and beneath the waste in a forward pushing motion, regardless of the length of the grass or how long the waste has been present.

Another object of the invention is to provide a collection pan immediately behind the beveled tines, to allow holding of multiple feces, thereby allowing pet owners or users to remove numerous feces prior to emptying the collected feces in a waste container.

A further object of the invention is to provide a tool that will easily pick up and hold feces from various surfaces such as: medium and tall grass, concrete, mulch and gravel areas.

It is another object to utilize materials in manufacture of the fork and collection area which is: durable yet light in weight, with a smooth finish thus reducing adherence of feces to the beveled tines and collection pan area, thus allowing easy cleaning.

Yet another object of the invention was to create a nearly indestructible tool from quality material with a strong handle with a grip on the long end.

In use, the long angled handle allows the user to grasp the handle grip with one hand and standing behind the feces, the user places the tool immediately behind the deposit and pushes the handle forward regardless of the surface, thus lifting and moving the feces over the beveled tines and into the collection pan at the rear of the implement. The narrowly separated beveled tines allow grass, mulch and small rocks to slip through the beveled tines while retaining the feces. Since the collection pan sits below the beveled tines, multiple waste deposits can be contained, while additional feces are collected.

DETAILED DESCRIPTION OF THE PRESENTLY PREFERRED EMBODIMENT

Figure 1:
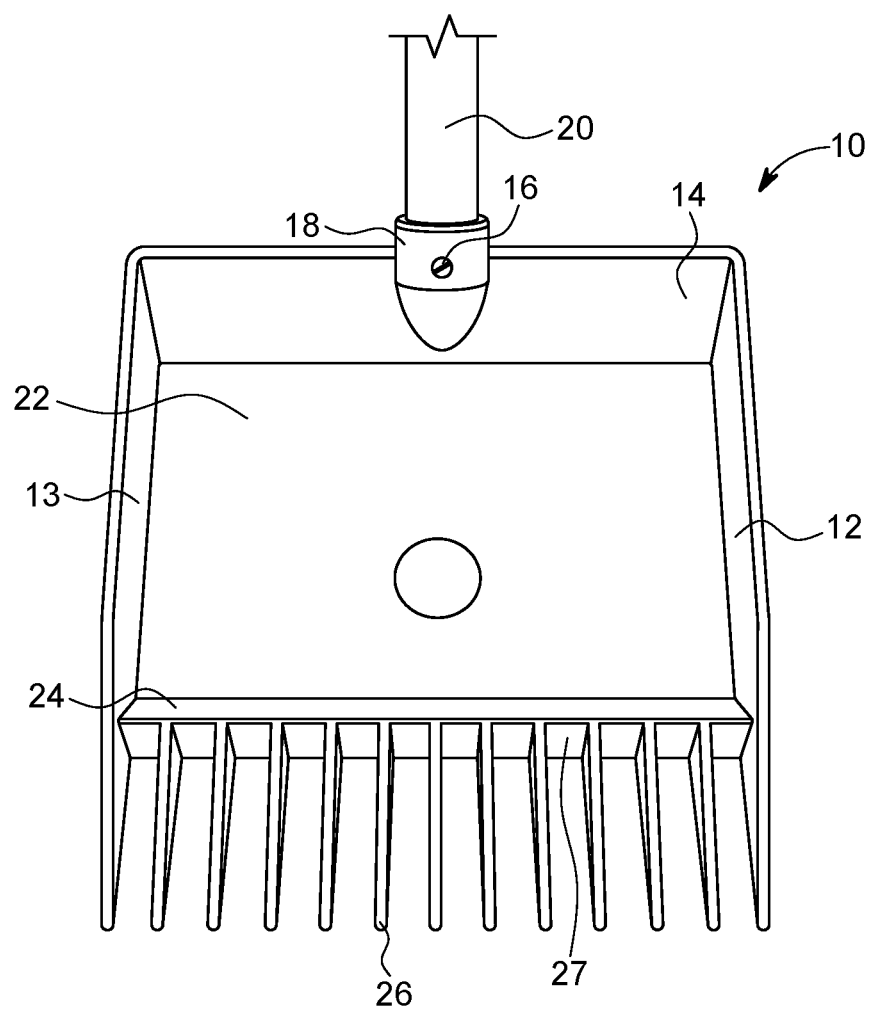
FIG. 1 is a front view perspective of the present invention.

Referring now to the drawings in more detail, FIG. 1 best illustrates the preferred form of the K9-Fork of the present invention 10, which comprises a long handle 20, which is inserted in the handle socket 18, located at the rear of the collection pan 22 and secured with a bolt 16. Said handle 20 is set at an appropriate angle for maximum leverage for pushing and lifting the feces over the beveled tines The front area of the invention 10 consists of a number of slightly beveled tines 26, which are a key element in slipping beneath the feces and guiding said feces back and into the collection pan 22. The collection pan 22 serves to contain multiple feces prior to disposal. The collection pan 22 is formed with a front wall 24, a slightly taller rear wall 14 and walls 12 and 13 on each side or the collection pan. The openings 27 between the beveled tines 26 is structured to allow any non-feces material such as grass, weeds, gravel, mulch and other small debris to be released through the openings 27, while the feces moves over the beveled tines 26 into the collection pan 22.

Figure 2:
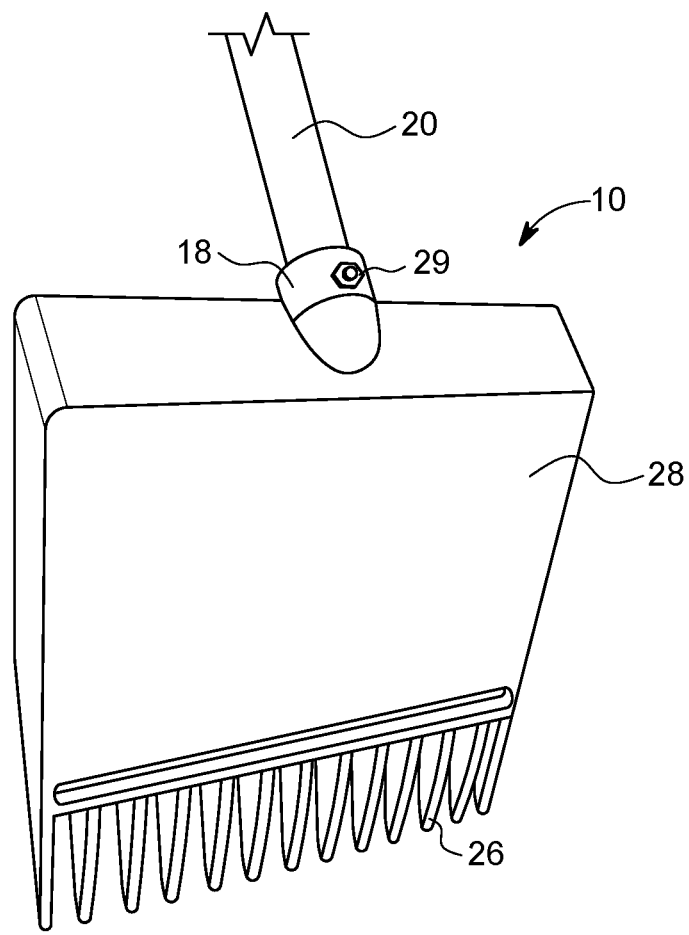
FIG. 2 is a rear view perspective of the present invention.

Referring briefly to FIG. 2, the bottom side of the collection pan 28 of the present invention 10 is a smooth, flat, sturdy surface to facilitate easy movement of the invention 10 on various surfaces. The bottom of the beveled tines 26 are slightly beveled upward to prevent entanglement with thick grass, weeds and other debris and allows the implement to easily slip beneath the waste and deposit said waste into the collection pan 22 from FIG. 1. In FIG. 2, a threaded nut 29 is firmly attached to the bolt 16 from FIG. 1 to secure the handle 20 into the handle socket 18.

Figure 3:
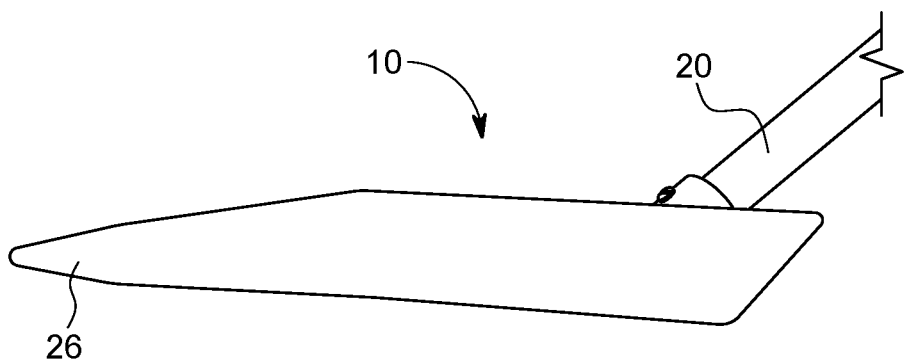
FIG. 3 is a side view perspective of the present invention.

FIG. 3 displays a side perspective view of the invention 10 and more clearly reflects the handle 20 fixed at a angle thus providing the user with significant leverage and placement behind the feces to guide and force the device beneath the feces, which is aided by the slightly beveled tines 26.

Figure 4:
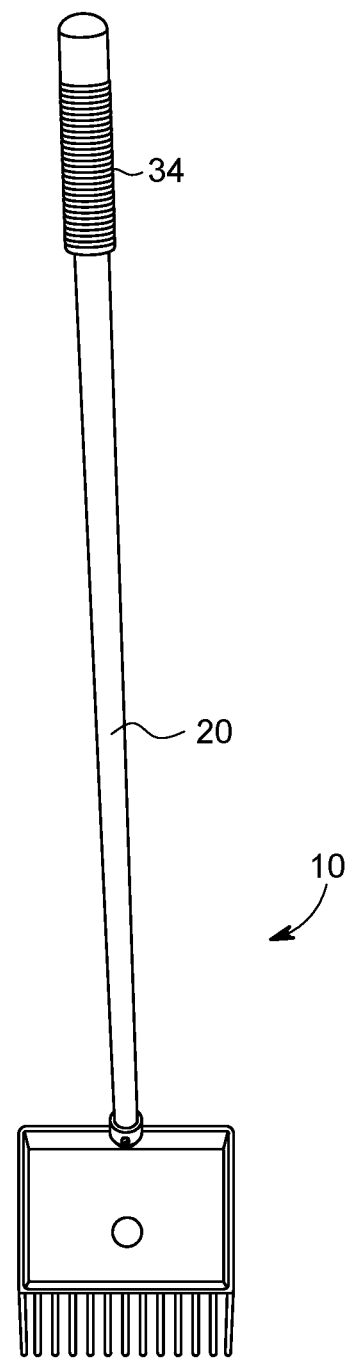
FIG. 4 is a full view of the present invention.

Referring now to FIG. 4, which reflects a full display of the invention 10, showing the long, solid handle 20, which allows the user to position behind and push the invention forward to collect and accumulate feces without having to bend over. Also displayed is a rubberized grip 34 at the end of the handle 20, to help guide the user by holding the invention 10 in the proper position at the grip 34.

The foregoing is considered as illustrative only of the principals of the invention. Further, since numerous modifications and changes may readily occur to those skilled in the art, it is not desired to limit the invention to the exact construction and operation shown and described, and accordingly, all suitable modifications and equivalents may be resorted to, falling within the scope of the invention.

What is claimed is as follows:

1. A utility tool for removal and collection of multiple canine feces comprising: a collection pan comprised of a solid flat bottom, a front wall, a rear wall, a pair of opposed flat side walls laterally attached to said front wall and said rear wall, whereby said walls form the perimeter of said collection pan; and a plurality of spaced-apart tines having beveled free ends project longitudinally and forwardly from said front wall of said collection pan, whereby the bottom of said plurality of spaced-apart tines extend co-planar to the bottom of said collection pan.

2. A utility tool according to claim 1, wherein a handle is affixed at the center of said rear wall of said collection pan at an angle whereby retention of collected feces in said collection pan remain while additional feces are being collected.

3. A utility tool according to claim 2, wherein said handle is of sufficient length and affixed at an appropriate angle at said rear wall whereby a person can perform feces collection in an upright position while retaining already collected feces in said collection pan.

4. A utility tool according to claim 2, wherein said handle is affixed at one end to the center of said rear wall, whereas the opposing end of said handle has a grip composed of a soft material sized to accommodate a human hand.

\* \* \* \* \*